J. VORRABER.
BALL BEARING.
APPLICATION FILED OCT. 27, 1916.
1,284,827.
Patented Nov. 12, 1918.
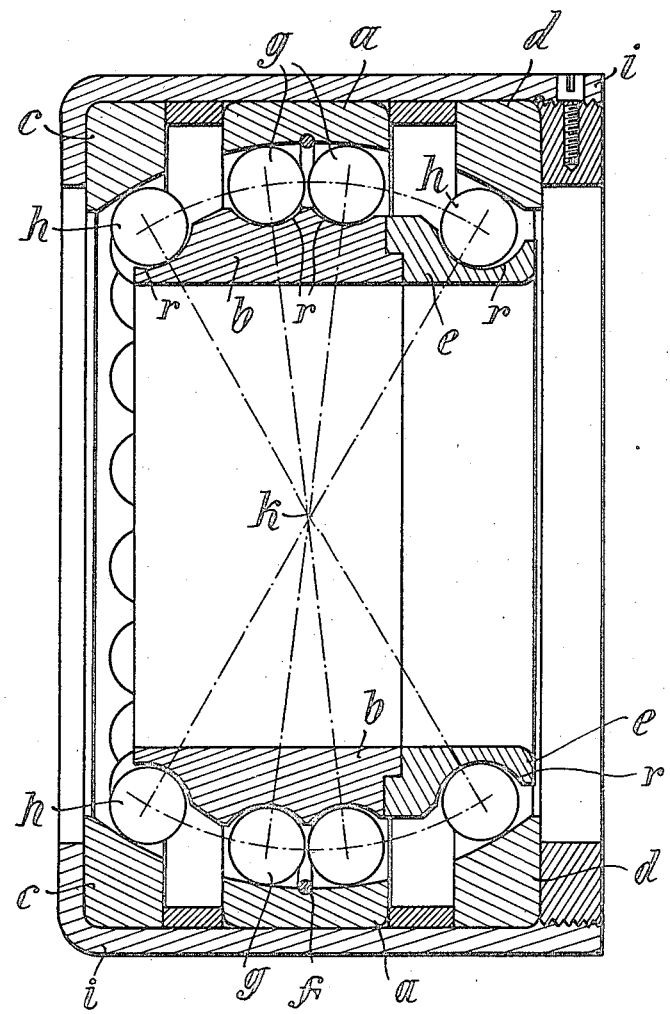

UNITED STATES PATENT OFFICE.

JOSEF VORRABER, OF MUNICH-TRUDERING, GERMANY.

BALL-BEARING.

1,284,827.　　　　　　　Specification of Letters Patent.　　Patented Nov. 12, 1918.

Application filed October 27, 1916.　Serial No. 128,053.

*To all whom it may concern:*

Be it known that I, JOSEF VORRABER, of 22 Auerfeldstrasse, Munich-Trudering, Bavaria, Germany, civil engineer, have invented certain new and useful Improvements in Ball-Bearings, of which the following is a specification.

My invention relates to improvements in ball-bearings as for instance disclosed in my Patent No. 1,172,648 dated February 22, 1916, and its object is to provide, a spherical self-alining ball bearing which is adapted to take up great radial loads as well as large end thrusts.

With this object in view, this ball-bearing has for example an inner ring, the latter being externally provided with two ball-races near its middle portion and with one ball-race near each end. Four rows or series of balls are provided to run in said ball races and three outer rings inclosing said balls. All outer rings are internally provided with spherical ball-races struck from a common center and these outer rings are accurately and non-adjustably assembled and permanently held in their correct relative positions. In this manner the radial load is evenly distributed to all four rows or series of balls and end-thrust is mainly taken up by all balls of one of the end rows and to a lesser degree by all balls of one of the central rows.

Reference is to be had to the accompanying drawing in which I have illustrated an embodiment of my invention by way of example.

The inner ring *b, e* of my improved ball bearing is supposed to be fixed on a shaft, not shown. This inner ring has externally four races *r* in which four rows or series of balls *h, h* and *g, g*, respectively are provided to run.

Three outer rings *a—c* and *d* which are internally provided with spherical ball-races struck from a common center *k* are forming the outer race-ways for the balls. The ring *a* is coöperating with the centrally located rows of balls *g—g* while the rings *c* and *d* are each coöperating with one of the laterally located rows of balls *h—h*. In order to accurately space the outer rings, spacing-rings M and N are inserted between them. In assembling the spacing ring M is placed between rings *a* and *c* and the spacing ring N between rings *a* and *d*. All rings are in this succession placed into a casing *i* and the ring O is screwed tightly into the casing, while a screw P is used for securely locking the ring O. The outer rings are in these positions ground spherically from the common center *k*. The rings are hereafter taken out of the casing, projection *f* is inserted into ring *a* and balls *g—g* as well as the inner rings *b—e* are assembled with the ring *a* as fully explained in my U. S. Patent No. 1,172,648. All rings are now inserted into the casing *i* in the same succession as before and are securely locked by ring O and by screw P, whereupon balls *h—h* are forced in from both ends of the bearing while swinging the ring *b—e* until the balls *g—g* are pressed tightly against the projection *f*. It is clear that the bearing is in this manner accurately and non-adjustably assembled. The radial load is evenly distributed to the four rows of balls and the end-thrust is perfectly distributed to all balls of one end-row and to a lesser degree to all balls of one of the central rows and all pressures are through the balls transmitted to rings *a, c* and *d*. If the rings *c* and *d* would be drawn apart, the entire radial load and end-thrust would be thrown on the centrally located rows of balls *g—g* and ring *a*, and if the rings *c* and *d* should be moved toward each other, the entire radial load and end-thrust would be thrown on balls *h—h* and on the rings *c*, and *d*. If any adjustment takes place drawing rings *c* and *d* together the self-alining feature of the bearing of course ceases to exist. Accurate and substantially non-adjustably assembling and correct spacing of the rings *a, c* and *d* are therefore absolutely necessary for the proper operation of this bearing.

Referring again to the projection *f*, the main object of which has been explained in my U. S. patent mentioned before, my present design enables assembling a larger number of rows of balls and a plurality of race-rings in a very simple and efficient manner. It also increases the capacity of the bearing for radial load and especially for end-thrust since the balls of the end rows can be made of any desired size and can fill-up the ball-races completely; my construction of ball-bearing preventing jamming, ball-cages can be dispensed with.

My improved ball-bearing is especially suitable for use with cranes, lathe spindles, worm-gears, transmission-shafts and railway-vehicles, etc., where the combination of the self-alining feature with large capacity for radial load and end-thrust is of great advantage.

Various changes suggest themselves. It is immaterial where the outer rings or inner rings are split or how many rings are used as long as correct assembling of the bearing is possible. It is also immaterial whether spacing rings are used as shown or other means are employed for spacing or whether the rings abut against each other. Narrow rings have been used by me to facilitate assembling and because narrow rings can be hardened better and more uniformly than wide rings. The proportionate diameter of the balls of the several rows depends on various conditions but balls of uniform size and a common radius for the spherical races have been used by me to facilitate accurate manufacturing.

What I claim is:

1. In a spherical self-alining ball bearing, an outer ring being internally provided with spherical ball races struck from a common center, an inner ring being externally provided with a plurality of ball races, three or more series of balls adapted to run in said races between said outer and inner rings, and a ring-shaped projection within said spherical ball races.

2. In a spherical self-alining ball-bearing, a plurality of outer rings being internally provided with spherical ball-races struck from a common center, an inner ring being externally provided with a plurality of ball-races, a plurality of series of balls adapted to run in said races between said outer and inner rings, and a ring-shaped projection within said spherical ball-races.

3. In a spherical self-alining ball-bearing, a plurality of outer rings, being internally provided with spherical ball-races struck from a common center, an inner ring being externally provided with two ball-races, two series of balls adapted to run in said races between said outer and inner rings, a ring-shaped projection within said spherical ball-races, means, non-dependent on the pressure exerted by said balls on said spherical races, for accurately spacing said outer rings and for maintaining their correct relative position.

4. In a spherical self-alining ball-bearing, a plurality of outer rings, the latter being internally provided with spherical ball-races struck from a common center, an inner ring being externally provided with two ball-races, two series of balls adapted to run in said races between said outer and inner rings, a ring-shaped projection within said spherical ball-races, means for accurately and substantially non-adjustably assembling said outer rings and for maintaining their correct relative positions.

5. In a spherical self-alining ball-bearing, a plurality of outer rings being internally provided with spherical ball-races struck from a common center, an inner ring being externally provided with two ball-races, two series of balls adapted to run in said races between said outer and inner rings, a ring-shaped projection within said spherical ball-races, means for assembling said outer rings in such a manner that the latter are forming substantially one solid non-adjustable outer ring.

6. In a spherical self-alining ball-bearing, a plurality of outer rings being internally provided with spherical ball-races struck from a common center, an inner ring being externally provided with a plurality of ball-races, a plurality of series of balls adapted to run in said races between said outer and inner rings, a ring-shaped projection within said spherical ball-races, means non-dependent on the pressure exerted by said balls on said spherical races for accurately spacing said outer rings and for maintaining their correct relative positions.

7. In a spherical self-alining ball-bearing, a plurality of outer rings being internally provided with spherical ball-races struck from a common center, an inner ring being externally provided with a plurality of ball-races, a plurality of series of balls adapted to run in said races between said outer and inner rings, a ring-shaped projection within said spherical races, means for accurately and substantially non-adjustably assembling said outer rings and maintaining their correct relative positions.

8. In a spherical self-alining ball-bearing, a plurality of outer rings being internally provided with spherical ball-races struck from a common center, an inner ring being externally provided with a plurality of ball-races, a plurality of series of balls adapted to run in said races between said outer and inner rings, a ring shaped projection, within one of said spherical races, means for assembling said outer rings in such a manner that the latter are forming substantially one solid non-adjustable outer ring.

In testimony whereof I hereunto affix my signature in the presence of two witnesses.

J. VORRABER.

Witnesses:
W. F. SPRIGELBERG,
AUGUSTE DIEHL.